Nov. 27, 1923.

L. J. HOGARTY

SECURING DEVICE

Filed Jan. 17, 1922

1,475,827

INVENTOR
L. J. HOGARTY
BY
ATTORNEYS

Patented Nov. 27, 1923.

1,475,827

UNITED STATES PATENT OFFICE.

LEO J. HOGARTY, OF BROOKLYN, NEW YORK.

SECURING DEVICE.

Application filed January 17, 1922. Serial No. 529,971.

*To all whom it may concern:*

Be it known that I, LEO J. HOGARTY, a citizen of the United States, and a resident of the city of New York, borough of Brooklyn, in the county of Kings and State of New York, have invented a new and useful Improvement in Securing Devices, of which the following is a full, clear, and exact description.

This invention relates to improvements in securing devices, particularly to a securing device which is designed for fastening a plurality of pieces of leather, metal, or any other material together.

An object of the invention is to provide a device of this character, which may serve the double purpose of a securing device and seal, or which may have suitable identifying indicia displayed thereon and be attached to a single thickness or sheet of material such as an automobile license plate, and serve only as a seal.

A further object of the invention is to provide a securing device which is comparatively easy to apply, and yet, a securing device which will firmly and securely hold after it has been applied.

A still further object is to provide a securing device which will be simple and practical in construction, durable and efficient in use, comparatively inexpensive to manufacture, and capable of numerous uses.

With these and other objects in view, the invention consists in certain novel features of construction and combinations and arrangements of parts as will be more fully hereinafter described and pointed out in the claims.

In the accompanying drawings:—

Figure 1:
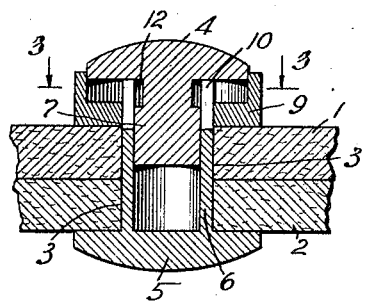
Figure 1 is a sectional view showing the rivet in applied position before the riveting operation.

Referring in detail to the drawings, I have indicated a pair of thicknesses of leather fabric 1 and 2 provided with registering openings 3 for the reception of my improved rivet.

The rivet comprises a headed male element 4 and a headed female element 5. The female element is provided with a hollow shank 6 adapted to be projected through the registering openings in the fabric and receive the solid shank 7 of the male element which is entered from the opposite side of the fabric.

9 represents a substantially cup-shaped washer which is positioned around the hollow shank 6 and located on the same side of the fabric as the male element 4. The cupped portion of the washer is of sufficient diameter to conveniently receive the head of the male element 4.

The hollow shank 6 adjacent its open end is provided with a plurality of longitudinal slits 10 which serve to define bendable tongues 11 adapted to bend or buckle when pressure is exerted longitudinally of the shank. An annular groove or recess 12 is formed in the solid shank 7 adjacent the head of the member 4.

Figure 2:
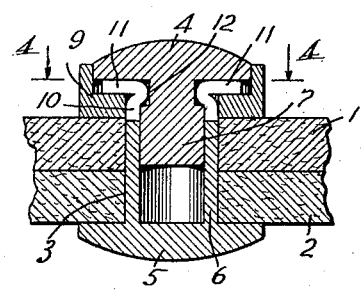
Figure 2 is a similar view showing the position of the parts after the riveting operation.
Figure 3:
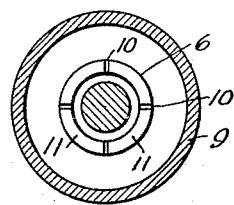
Figure 3 is a view in transverse section on the line 3—3 of Figure 1.
Figure 4:
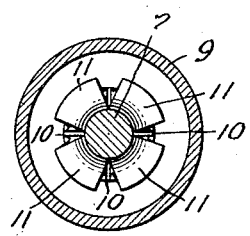
Figure 4 is a similar view on the line 4—4 of Figure 2.

After the rivet has been assembled, as shown in Figure 1, the riveting operation is performed by placing the head of the female element on an anvil and striking the head of the male element. As the head of the male element is struck, the ends of the tongues 11 will be bent upwardly and clamped between the washer 9 and the head of the male element. At the same time the intermediate portion of these tongues will kick back or bend inwardly under the stress of the blow and will be forced into the groove 12, as seen in Figure 2, thereby absolutely locking the two shanks against separation. The riveting operation also serves to drive the head 4 into the cupped portion of the washer 9 so that it is impossible to insert a tool under the head of the male element for the purpose of prying the shanks apart. The head of the male member may have any suitable indicia displayed thereon, as before suggested.

From the foregoing description, it will be seen that I provide a rivet which is very simple in operation and easy to apply, and yet, which will take a tremendous amount of power to remove, it being necessary to break the rivet in order to separate the interlocked shanks.

The exact shape of the groove or recess 12 might be considerably altered and various other slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. A securing device comprising a male element, including a head and a solid shank, and a female element including a head and a hollow shank receiving the solid shank, a washer receiving the hollow shank, and means whereby advancement of the heads toward each other upsets the open end of the hollow shank and clamps the same between the head of the male element and the washer.

2. A securing device comprising a male element, including a head and a solid shank, and a female element including a head and a hollow shank receiving the solid shank, a washer receiving the hollow shank, and means whereby advancement of the heads toward each other upsets the open end of the hollow shank and clamps the same between the head of the male element and the washer, said solid shank having a recess therein into which a portion of said hollow sleeve is adapted to buckle during the clamping operation.

3. A securing device including a male and a female element adapted to enter opposite sides of material to be riveted, said male element including a head and a solid shank, said female element including a head and a hollow shank receiving said solid shank, a cup-shaped washer receiving the hollow shank and located on the opposite side of the material from the head of the female element, said hollow shank being slitted longitudinally adjacent its open end, whereby it is buckled and clamped between the washer and the head of the solid shank when the two heads are advanced toward one another.

4. A securing device including a male and female element adapted to enter opposite sides of material to be riveted, said male element including a head and a solid shank, said female element including a head and a hollow shank receiving said solid shank, a cup-shaped washer receiving the hollow shank and located on the opposite side of the material from the head of the female element, said hollow shank being slitted longitudinally adjacent its open end, whereby it is buckled and clamped between the washer and the head of the solid shank when the two heads are advanced toward one another, and said solid shank having an annular groove therein into which a portion of said hollow shank is adapted to buckle upon advance of the heads toward each other.

5. A securing device and seal, comprising headed interlocking male and female shanks, the head of one shank adapted to have indicia displayed thereon, and a cup-shaped washer around the shanks receiving said head and locked to one of said shanks.

6. A securing device including a headed hollow shank member and a headed solid shank member adapted to be received therein, said headed solid shank member having a recess, and a flanged washer adapted to surround the headed hollow shank member, said flanged washer adapted to receive the opposite end of the hollow shank member upon movement of the two shank members toward each other.

7. A securing device comprising a male element including a head and a solid shank and a female element including a head and a hollow shank receiving said solid shank, a flanged washer receiving the hollow shank, and means whereby advancement of the heads toward each other buckles the open end of the hollow shank within the confines of said flanged washer.

8. A securing device comprising a male member including a head and a solid shank, a female member including a head and a hollow shank receiving the solid shank, a flanged washer adapted to receive the head of the solid shank, and means whereby advancement of the heads toward each other buckles the lower end of the hollow shank and clamps the same between the head of the solid shank and the washer and within the confines of the flange thereof.

LEO J. HOGARTY.